(12) United States Patent
Niergarth et al.

(10) Patent No.: US 12,139,270 B2
(45) Date of Patent: Nov. 12, 2024

(54) AIRCRAFT THERMAL TRANSPORT SYSTEM AND METHOD

(71) Applicant: General Electric Company, Schenectady, NY (US)

(72) Inventors: Daniel Alan Niergarth, Norwood, OH (US); Brandon Wayne Miller, Liberty Township, OH (US); Michael Robert Bonacum, Cincinnati, OH (US); John Michael Pyles, West Chester, OH (US)

(73) Assignee: General Electric Company, Evendale, OH (US)

( * ) Notice: Subject to any disclaimer, the term of this patent is extended or adjusted under 35 U.S.C. 154(b) by 283 days.

(21) Appl. No.: 17/233,812

(22) Filed: Apr. 19, 2021

(65) Prior Publication Data

US 2022/0332431 A1  Oct. 20, 2022

(51) Int. Cl.
*B64D 37/32* (2006.01)
*B01D 19/00* (2006.01)
*B64D 37/34* (2006.01)

(52) U.S. Cl.
CPC ......... *B64D 37/32* (2013.01); *B01D 19/0005* (2013.01); *B64D 37/34* (2013.01)

(58) Field of Classification Search
CPC ......... B64D 37/34; F02M 37/22; F02C 7/232; F02C 7/22; B60K 3/04
See application file for complete search history.

(56) References Cited

U.S. PATENT DOCUMENTS

| | | |
|---|---|---|
| 2,582,842 A | 1/1952 | Messinger |
| 2,720,313 A | 10/1955 | Pattison |
| 2,893,628 A | 7/1959 | Herman |
| 3,050,240 A | 8/1962 | Darnell |
| 3,178,105 A | 4/1965 | Darnell |
| 3,590,559 A | 7/1971 | Bragg |
| 3,847,298 A | 11/1974 | Hamilton |
| 3,895,243 A | 7/1975 | Amend et al. |

(Continued)

FOREIGN PATENT DOCUMENTS

| | | |
|---|---|---|
| EP | 2003311 A2 | 12/2008 |
| EP | 3018304 A1 | 5/2016 |

(Continued)

OTHER PUBLICATIONS

Landfill, Sewage, Biogas, Coal, Seam & Mines Gas Separation/Filtration, Kelburn Engineering—LandfillGas and Air Separation, 3 pages. www.kelbumeng.com.uk//landfill-gas-bio-gas-sewer-gas.php.

*Primary Examiner* — Youngsul Jeong
(74) *Attorney, Agent, or Firm* — Dority & Manning, P.A.

(57) ABSTRACT

A system and method for using a fuel with an engine, an airframe having an aircraft heat load, a fuel tank, and a fuel oxygen reduction unit are provided. The method includes receiving an inlet fuel flow in the fuel oxygen reduction unit for reducing an amount of oxygen in the inlet fuel flow; separating a fuel/gas mixture within the fuel oxygen reduction unit into an outlet gas flow and an outlet fuel flow exiting the fuel oxygen reduction unit; controlling a first portion of the outlet fuel flow to the engine; and controlling a second portion of the outlet fuel flow to the airframe to transfer heat between the second portion of the outlet fuel flow and the aircraft heat load.

9 Claims, 5 Drawing Sheets

(56) References Cited

U.S. PATENT DOCUMENTS

| | | | |
|---|---|---|---|
| 3,902,658 A | 9/1975 | Madsen |
| 4,169,567 A | 10/1979 | Tamura |
| 4,170,116 A | 10/1979 | Williams |
| 4,449,372 A | 5/1984 | Rilett |
| 4,503,682 A | 3/1985 | Rosenblatt |
| 4,505,124 A | 3/1985 | Mayer |
| 4,550,573 A | 11/1985 | Rannenberg |
| 4,600,413 A | 7/1986 | Sugden |
| 4,714,139 A | 12/1987 | Lorenz et al. |
| 4,738,779 A | 4/1988 | Carroll et al. |
| 4,755,197 A | 7/1988 | Benson et al. |
| 4,773,212 A | 9/1988 | Griffin et al. |
| 4,776,536 A | 10/1988 | Hudson et al. |
| 5,149,018 A | 9/1992 | Clark |
| 5,267,608 A | 12/1993 | Coffinberry |
| 5,313,790 A | 5/1994 | Barr |
| 5,341,636 A | 8/1994 | Paul |
| 5,414,992 A | 5/1995 | Glickstein |
| 5,452,573 A | 9/1995 | Glickstein et al. |
| 5,587,068 A | 12/1996 | Aho, Jr. et al. |
| 5,622,621 A | 4/1997 | Kramer |
| 5,667,168 A | 9/1997 | Fluegel |
| 5,722,241 A | 3/1998 | Huber |
| 5,724,806 A | 3/1998 | Homer |
| 5,904,836 A | 5/1999 | Lee et al. |
| 6,134,876 A | 10/2000 | Hines et al. |
| 6,182,435 B1 | 2/2001 | Niggemann et al. |
| 6,250,097 B1 | 6/2001 | Lui et al. |
| 6,294,091 B1 | 9/2001 | Hoff |
| 6,415,595 B1 | 7/2002 | Wilmot, Jr. et al. |
| 6,435,454 B1 | 8/2002 | Engelhardt |
| 6,701,717 B2 | 3/2004 | Flatman et al. |
| 6,702,729 B2 | 3/2004 | Mazzuca |
| 6,892,710 B2 | 5/2005 | Ekstam |
| 6,939,392 B2 | 9/2005 | Huang et al. |
| 7,093,437 B2 | 8/2006 | Spadaccini et al. |
| 7,231,769 B2 | 6/2007 | Spadaccini et al. |
| 7,260,926 B2 | 8/2007 | Sabatino et al. |
| 7,334,407 B2 | 2/2008 | Spadaccini et al. |
| 7,377,098 B2 | 5/2008 | Walker et al. |
| 7,387,602 B1 | 6/2008 | Kirsch |
| 7,398,641 B2 | 7/2008 | Stretton et al. |
| 7,431,818 B2 | 10/2008 | Cipollini |
| 7,459,081 B2 | 12/2008 | Koenig et al. |
| 7,536,851 B2 | 5/2009 | McLain |
| 7,569,099 B2 | 8/2009 | Coffin et al. |
| 7,628,965 B2 | 12/2009 | Johnson et al. |
| 7,694,916 B2 | 4/2010 | Limaye et al. |
| 7,735,670 B2 | 6/2010 | Zaki et al. |
| 7,744,827 B2 | 6/2010 | Vanderspurt et al. |
| 7,824,470 B2 | 11/2010 | Chiappetta et al. |
| 7,836,680 B2 | 11/2010 | Schwarz et al. |
| 7,882,704 B2 | 2/2011 | Chen |
| 7,896,292 B2 | 3/2011 | Limaye et al. |
| 7,905,259 B2 | 3/2011 | Johnson et al. |
| 7,966,807 B2 | 6/2011 | Norris et al. |
| 7,987,676 B2 | 8/2011 | Ast et al. |
| 8,015,823 B2 | 9/2011 | Vanderspurt et al. |
| 8,055,437 B2 | 11/2011 | Proietty et al. |
| 8,141,360 B1 | 3/2012 | Huber |
| 8,177,884 B2 | 5/2012 | Schmidt et al. |
| 8,231,714 B2 | 7/2012 | Cornet et al. |
| 8,261,258 B1 | 9/2012 | Chillar et al. |
| 8,388,830 B2 | 3/2013 | Sohn et al. |
| 8,450,020 B2 | 5/2013 | Sinha et al. |
| 8,499,567 B2 | 8/2013 | Hagh et al. |
| 8,499,822 B2 | 8/2013 | Bulin et al. |
| 8,522,572 B2 | 9/2013 | Coffinberry et al. |
| 8,602,362 B2 | 12/2013 | Buchwald |
| 8,663,996 B2 | 3/2014 | Beeson |
| 8,765,070 B2 | 7/2014 | Norton et al. |
| 8,789,377 B1 | 7/2014 | Brostmeyer |
| 8,821,362 B2 | 9/2014 | Kidd et al. |
| 8,828,344 B2 | 9/2014 | K-WLam et al. |
| 8,858,161 B1 | 10/2014 | Ryznic et al. |
| 8,944,367 B2 | 2/2015 | Bystry, Jr. et al. |
| 8,978,353 B2 | 3/2015 | Norton et al. |
| 8,984,884 B2 | 3/2015 | Xu et al. |
| 9,014,791 B2 | 4/2015 | Held |
| 9,038,397 B2 | 5/2015 | Papa et al. |
| 9,120,580 B2 | 9/2015 | Sampath |
| 9,144,768 B2 | 9/2015 | Tichborne et al. |
| 9,150,300 B2 | 10/2015 | Vanderspurt et al. |
| 9,162,162 B2 | 10/2015 | Yount |
| 9,231,267 B2 | 1/2016 | McAlister |
| 9,435,246 B2 | 9/2016 | Devarakonda |
| 9,567,095 B2 | 2/2017 | McCarthy et al. |
| 9,580,185 B2 | 2/2017 | Rhoden et al. |
| 9,656,187 B2 | 5/2017 | Lo et al. |
| 9,687,773 B2 | 6/2017 | Johnson et al. |
| 9,724,625 B2 | 8/2017 | Lo |
| 9,752,507 B2 | 9/2017 | Selstad et al. |
| 9,771,867 B2 | 9/2017 | Karam et al. |
| 9,834,315 B2 | 12/2017 | Lo et al. |
| 9,863,322 B2 | 1/2018 | Williams |
| 9,885,290 B2 | 2/2018 | Della-Fera et al. |
| 9,897,054 B2 | 2/2018 | Lo et al. |
| 10,099,797 B2 | 10/2018 | Vanderspurt et al. |
| 10,260,419 B2 | 4/2019 | Cerny et al. |
| 2009/0133380 A1 | 5/2009 | Donnerhack |
| 2009/0158739 A1 | 6/2009 | Messmer |
| 2009/0188234 A1 | 7/2009 | Suciu et al. |
| 2010/0212857 A1 | 8/2010 | Bulin et al. |
| 2010/0313591 A1 | 12/2010 | Lents et al. |
| 2011/0000227 A1 | 1/2011 | Kamiya |
| 2011/0262309 A1 | 10/2011 | Limaye et al. |
| 2012/0216502 A1 | 8/2012 | Freund et al. |
| 2012/0216677 A1 | 8/2012 | Koenig et al. |
| 2013/0186100 A1 | 7/2013 | Rhoden et al. |
| 2014/0000275 A1 | 1/2014 | Kesseli et al. |
| 2014/0165570 A1 | 6/2014 | Herring |
| 2014/0205446 A1 | 7/2014 | Patsouris et al. |
| 2014/0345292 A1 | 11/2014 | Diaz et al. |
| 2014/0360153 A1 | 12/2014 | Papa et al. |
| 2015/0000291 A1 | 1/2015 | Smith et al. |
| 2015/0040986 A1 | 2/2015 | Tichborne et al. |
| 2015/0072850 A1 | 3/2015 | Derrick et al. |
| 2015/0159867 A1 | 6/2015 | Patrick et al. |
| 2016/0003160 A1 | 1/2016 | Hagshenas |
| 2016/0096629 A1 | 4/2016 | Vaisman |
| 2016/0108814 A1 | 4/2016 | Schmitz |
| 2016/0138431 A1 | 5/2016 | Lear, Jr. |
| 2016/0167802 A1* | 6/2016 | Lo ................ B64D 37/34 96/187 |
| 2016/0208759 A1 | 7/2016 | Lo et al. |
| 2016/0245144 A1 | 8/2016 | Selberg et al. |
| 2016/0290214 A1 | 10/2016 | Ekanayake et al. |
| 2016/0305440 A1 | 10/2016 | Laboda et al. |
| 2016/0369700 A1 | 12/2016 | Ribarov et al. |
| 2017/0030266 A1 | 2/2017 | Cerny et al. |
| 2017/0096910 A1 | 4/2017 | Raimarckers et al. |
| 2017/0113807 A1 | 4/2017 | Burnell et al. |
| 2017/0114721 A1 | 4/2017 | Miller et al. |
| 2017/0141419 A1 | 5/2017 | Wu et al. |
| 2017/0159566 A1 | 6/2017 | Sennoun et al. |
| 2017/0167382 A1 | 6/2017 | Miller et al. |
| 2017/0291714 A1 | 10/2017 | Corman |
| 2018/0016025 A1 | 1/2018 | Rheaume et al. |
| 2018/0056233 A1 | 3/2018 | Henson et al. |
| 2018/0056234 A1 | 3/2018 | Weng et al. |
| 2018/0071659 A1 | 3/2018 | Rhoden |
| 2018/0118367 A1 | 5/2018 | Rheaume et al. |
| 2019/0128186 A1 | 5/2019 | Cerny et al. |
| 2019/0153952 A1* | 5/2019 | Niergarth ............... F02C 7/14 |
| 2019/0153953 A1 | 5/2019 | Niergarth et al. |
| 2020/0141337 A1 | 5/2020 | O'Connor et al. |

FOREIGN PATENT DOCUMENTS

| | | |
|---|---|---|
| EP | 3075957 A1 | 10/2016 |
| GB | 2136880 A | 9/1984 |
| GB | 2204361 A | 11/1988 |
| JP | S5932893 U | 2/1984 |
| WO | WO 02/16743 A1 | 2/2002 |

(56) References Cited

FOREIGN PATENT DOCUMENTS

| | | |
|---|---|---|
| WO | WO2002/038938 A1 | 5/2002 |
| WO | WO2006/079438 A1 | 8/2006 |
| WO | WO2011/038188 A1 | 3/2011 |

* cited by examiner

AIRCRAFT THERMAL TRANSPORT SYSTEM AND METHOD

FIELD OF THE INVENTION

The present subject matter relates generally to an aircraft thermal transport system including a fuel oxygen reduction unit and a method of operating the same.

BACKGROUND OF THE INVENTION

Typical aircraft propulsion systems include one or more gas turbine engines. The gas turbine engines generally include a turbomachine, the turbomachine including, in serial flow order, a compressor section, a combustion section, a turbine section, and an exhaust section. In operation, air is provided to an inlet of the compressor section where one or more axial compressors progressively compress the air until it reaches the combustion section. Fuel is mixed with the compressed air and burned within the combustion section to provide combustion gases. The combustion gases are routed from the combustion section to the turbine section. The flow of combustion gasses through the turbine section drives the turbine section and is then routed through the exhaust section, e.g., to atmosphere.

Certain operations and systems of the gas turbine engines and aircraft may generate a relatively large amount of heat. Fuel has been determined to be an efficient heat sink to receive at least some of such heat during operations due at least in part to its heat capacity and an increased efficiency in combustion operations that may result from combusting higher temperature fuel.

However, heating the fuel up without properly conditioning the fuel may cause the fuel to "coke," or form solid particles that may clog up certain components of the fuel system, such as the fuel nozzles. Furthermore, such coking of the fuel prevents using fuel in higher temperature systems and applications. As such, polyalphaolefin (PAO) lubricants are used in systems on an aircraft for high temperature applications. Reducing an amount of oxygen in the fuel may effectively reduce the likelihood that the fuel will coke beyond an unacceptable amount and enable fuel to be used in higher temperature systems and applications.

BRIEF DESCRIPTION OF THE INVENTION

Aspects and advantages of the invention will be set forth in part in the following description, or may be obvious from the description, or may be learned through practice of the invention.

In an exemplary aspect of the present disclosure, a method is provided for using a fuel with an engine, an airframe having an aircraft heat load, a fuel tank, and a fuel oxygen reduction unit. The method includes receiving an inlet fuel flow in the fuel oxygen reduction unit for reducing an amount of oxygen in the inlet fuel flow; separating a fuel/gas mixture within the fuel oxygen reduction unit into an outlet gas flow and an outlet fuel flow exiting the fuel oxygen reduction unit; controlling a first portion of the outlet fuel flow to the engine; and controlling a second portion of the outlet fuel flow to the airframe to transfer heat between the second portion of the outlet fuel flow and the aircraft heat load.

In certain exemplary aspects the method includes sending the outlet fuel flow exiting the fuel oxygen reduction unit to a metering unit that splits and controls the first portion of the outlet fuel flow and the second portion of the outlet fuel flow.

In certain exemplary aspects the method includes directing a bypass flow of a third portion of the outlet fuel flow from the metering unit to the fuel tank.

In certain exemplary aspects the outlet fuel flow is deoxygenated fuel.

In certain exemplary aspects the second portion of the outlet fuel flow cools the aircraft heat load.

In certain exemplary aspects the second portion of the outlet fuel flow is at a temperature greater than 250 degrees Fahrenheit.

In certain exemplary aspects the second portion of the outlet fuel flow is at a temperature greater than 300 degrees Fahrenheit.

In certain exemplary aspects the second portion of the outlet fuel flow is at a temperature greater than 400 degrees Fahrenheit.

In certain exemplary aspects the method includes directing the second portion of the outlet fuel flow that cools the aircraft heat load to a fuel-fuel heat exchanger.

In certain exemplary aspects the separating step comprises reducing an amount of oxygen in the inlet fuel flow using a stripping gas flow through a stripping gas flowpath and separating the fuel/gas mixture within the fuel oxygen reduction unit into an outlet stripping gas flow and the outlet fuel flow exiting the fuel oxygen reduction unit.

In certain exemplary aspects the method includes storing a portion of the outlet fuel flow exiting the fuel oxygen reduction unit in a secondary fuel tank.

In an exemplary embodiment of the present disclosure, an aircraft thermal transport system is provided. The aircraft thermal transport system includes an engine; an airframe having an aircraft heat load; a fuel tank having a fuel; a fuel oxygen reduction unit in communication with an inlet fuel flow from the fuel tank, the fuel oxygen reduction unit configured to reduce an amount of oxygen in the inlet fuel flow, wherein an outlet fuel flow exits the fuel oxygen reduction unit; and a control unit in communication with the outlet fuel flow from the fuel oxygen reduction unit, wherein the control unit is configured to direct a first portion of the outlet fuel flow to the engine, and wherein the control unit is configured to direct a second portion of the outlet fuel flow to the airframe to transfer heat between the second portion of the outlet fuel flow and the aircraft heat load.

In certain exemplary embodiments the control unit is configured to direct a bypass portion of the outlet fuel flow back to the fuel tank.

In certain exemplary embodiments the outlet fuel flow is deoxygenated fuel.

In certain exemplary embodiments the second portion of the outlet fuel flow cools the aircraft heat load.

In certain exemplary embodiments the second portion of the outlet fuel flow is at a temperature greater than 300 degrees Fahrenheit.

In certain exemplary embodiments the second portion of the outlet fuel flow is at a temperature greater than 400 degrees Fahrenheit.

In certain exemplary embodiments the system includes a fuel-fuel heat exchanger in communication with the second portion of the outlet fuel flow downstream of the airframe.

In certain exemplary embodiments the system includes a secondary fuel tank in communication with a portion of the outlet fuel flow that exits the fuel oxygen reduction unit.

In certain exemplary embodiments wherein the fuel oxygen reduction unit includes a stripping gas line; a contactor in fluid communication with the stripping gas line and the inlet fuel flow for forming a fuel/gas mixture; and a separator in fluid communication with the contactor, the separator receives the fuel/gas mixture and separates the fuel/gas mixture into an outlet stripping gas flow and the outlet fuel flow.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Corresponding reference characters indicate corresponding parts throughout the several views. The exemplifications set out herein illustrate exemplary embodiments of the disclosure, and such exemplifications are not to be construed as limiting the scope of the disclosure in any manner.

DETAILED DESCRIPTION OF THE INVENTION

Figure 1:
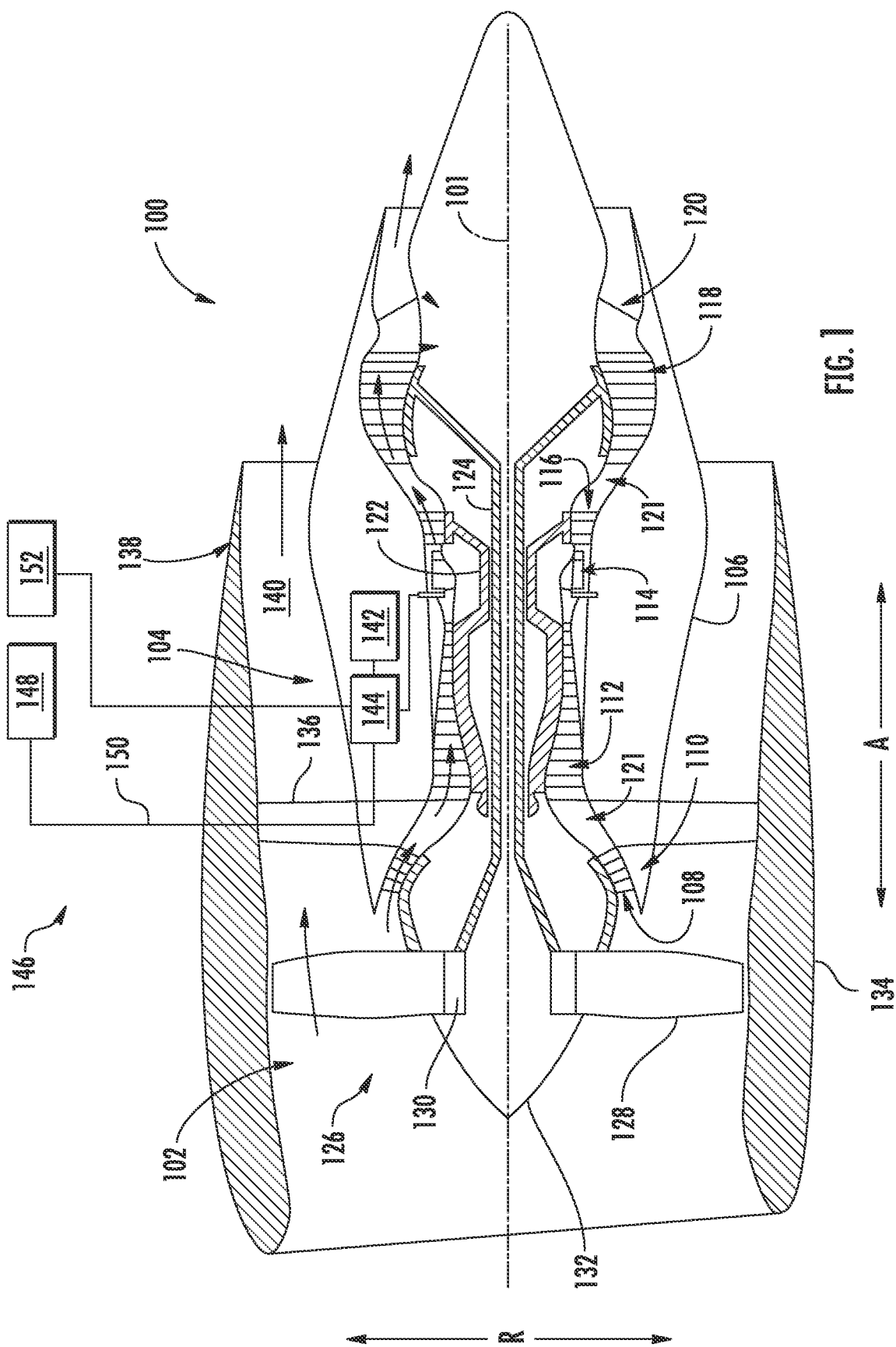
FIG. 1 is a schematic, cross-sectional view of a gas turbine engine in accordance with an exemplary embodiment of the present disclosure.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

The following description is provided to enable those skilled in the art to make and use the described embodiments contemplated for carrying out the invention. Various modifications, equivalents, variations, and alternatives, however, will remain readily apparent to those skilled in the art. Any and all such modifications, variations, equivalents, and alternatives are intended to fall within the spirit and scope of the present invention.

For purposes of the description hereinafter, the terms "upper", "lower", "right", "left", "vertical", "horizontal", "top", "bottom", "lateral", "longitudinal", and derivatives thereof shall relate to the invention as it is oriented in the drawing figures. However, it is to be understood that the invention may assume various alternative variations, except where expressly specified to the contrary. It is also to be understood that the specific devices illustrated in the attached drawings, and described in the following specification, are simply exemplary embodiments of the invention. Hence, specific dimensions and other physical characteristics related to the embodiments disclosed herein are not to be considered as limiting.

As used herein, the terms "first", "second", and "third" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached to," and the like refer to both direct coupling, fixing, or attaching, as well as indirect coupling, fixing, or attaching through one or more intermediate components or features, unless otherwise specified herein.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

In an aircraft thermal transport system of the present disclosure, the aircraft thermal transport system utilizes a fuel oxygen reduction unit to remove or reduce the oxygen content of an inlet fuel flow and to provide an outlet fuel flow that exits the fuel oxygen reduction unit having a relatively low oxygen content, e.g., the outlet fuel flow is deoxygenated fuel. Accordingly, this enables the system of the present disclosure to use the fuel between an engine and an airframe to transport and reject heat. In the system of the present disclosure the fuel is now able to operate at the higher temperature requirements required of such a system without the risk of the fuel "coking". In other words, by utilizing the outlet fuel flow being a deoxygenated fuel, the system of the present disclosure enables using the fuel directly to cool the avionics/aircraft heat load demands and thereby eliminates the need for an additional fluid PAO system and all of the complexity, weight, and cost associated with it. The system of the present disclosure enables the use of the deoxygenated fuel as a coolant for components of the airframe.

This has been impossible in conventional systems due to the temperature limitations of fuel. For example, in conventional systems, due to the oxygen in the fuel, heating the fuel up in this manner may cause the fuel to "coke" as described above. As such, in conventional systems, a dedicated intermediate fluid system, e.g., a PAO system, is used to move heat from aircraft avionics and other loads to be rejected by engine air and fuel. The use of a PAO system in conventional systems introduces the need for an additional fluid PAO system and all of the complexity, weight, and cost associated with it.

Referring now to the drawings, wherein identical numerals indicate the same elements throughout the figures, FIG. 1 provides a schematic, cross-sectional view of an engine in accordance with an exemplary embodiment of the present disclosure. The engine may be incorporated into a vehicle. For example, the engine may be an aeronautical engine incorporated into an aircraft. It is contemplated that the engine and the system of the present disclosure are part of a military aircraft capable of supersonic speeds. Alternatively, however, the engine may be any other suitable type of engine for any other suitable aircraft.

For the embodiment depicted, the engine is configured as a high bypass turbofan engine 100. As shown in FIG. 1, the turbofan engine 100 defines an axial direction A (extending parallel to a longitudinal centerline or axis 101 provided for reference), a radial direction R, and a circumferential direction (extending about the axial direction A; not depicted in FIG. 1). In general, the turbofan 100 includes a fan section 102 and a turbomachine 104 disposed downstream from the fan section 102.

The exemplary turbomachine 104 depicted generally includes a substantially tubular outer casing 106 that defines an annular inlet 108. The outer casing 106 encases, in serial flow relationship, a compressor section including a booster or low pressure (LP) compressor 110 and a high pressure (HP) compressor 112; a combustion section 114; a turbine section including a high pressure (HP) turbine 116 and a low pressure (LP) turbine 118; and a jet exhaust nozzle section 120. The compressor section, combustion section 114, and turbine section together define at least in part a core air flowpath 121 extending from the annular inlet 108 to the jet nozzle exhaust section 120. The turbofan engine further includes one or more drive shafts. More specifically, the turbofan engine includes a high pressure (HP) shaft or spool 122 drivingly connecting the HP turbine 116 to the HP compressor 112, and a low pressure (LP) shaft or spool 124 drivingly connecting the LP turbine 118 to the LP compressor 110.

For the embodiment depicted, the fan section 102 includes a fan 126 having a plurality of fan blades 128 coupled to a disk 130 in a spaced apart manner. The fan blades 128 and disk 130 are together rotatable about the longitudinal axis 101 by the LP shaft 124. The disk 130 is covered by rotatable front hub 132 aerodynamically contoured to promote an airflow through the plurality of fan blades 128. Further, an annular fan casing or outer nacelle 134 is provided, circumferentially surrounding the fan 126 and/or at least a portion of the turbomachine 104. The nacelle 134 is supported relative to the turbomachine 104 by a plurality of circumferentially-spaced outlet guide vanes 136. A downstream section 138 of the nacelle 134 extends over an outer portion of the turbomachine 104 so as to define a bypass airflow passage 140 therebetween.

Referring still to FIG. 1, the turbofan engine 100 additionally includes an accessory gearbox 142, a fuel oxygen reduction unit 144, and a fuel delivery system 146. Although for the embodiment shown, the accessory gearbox 142 is located within the cowling/outer casing 106 of the turbomachine 104, it is contemplated that the accessory gearbox 142 may be located within other portions of the turbomachine 104. For example, the accessory gearbox 142 may be located within portions of the fan 126 of the turbomachine 104, e.g., a fan cowl or other portion of the fan 126. In such a configuration, the accessory gearbox 142 is not mounted on the core, may still be driven by the HP shaft 122, and does not readily have access to the engine bleeds. Additionally, it will be appreciated that, although not depicted schematically in FIG. 1, the accessory gearbox 142 may be mechanically coupled to, and rotatable with, one or more shafts or spools of the turbomachine 104. For example, in at least certain exemplary embodiments, the accessory gearbox 142 may be mechanically coupled to, and rotatable with, the HP shaft 122. Further, for the embodiment shown, the fuel oxygen reduction unit 144 is coupled to, or otherwise rotatable with, the accessory gearbox 142, although in other embodiments the fuel oxygen conversion unit 144 may use other, or additional sources, of rotary power such as an electric motor. In such a manner, it will be appreciated that the exemplary fuel oxygen reduction unit 144 is driven by the accessory gearbox 142. Notably, as used herein, the term "fuel oxygen conversion or reduction" generally means a device capable of reducing a free oxygen content of the fuel.

Moreover, the fuel delivery system 146 generally includes a fuel source 148, such as a fuel tank, and one or more fuel lines 150. The one or more fuel lines 150 provide a fuel flow through the fuel delivery system 146 to the combustion section 114 of the turbomachine 104 of the turbofan engine 100. Furthermore, the fuel source 148 and the fuel oxygen reduction unit 144 are in communication with an airframe 152 having an aircraft heat load as shown in FIG. 1 and as described in further detail with reference to FIGS. 3-5.

It will be appreciated, however, that the exemplary turbofan engine 100 depicted in FIG. 1 is provided by way of example only. In other exemplary embodiments, any other suitable engine may be utilized with aspects of the present disclosure. It is contemplated that the engine and the system of the present disclosure are part of a military aircraft capable of supersonic speeds. In other embodiments, the engine may be any other suitable gas turbine engine, such as a turboshaft engine, turboprop engine, turbojet engine, etc. In such a manner, it will further be appreciated that in other embodiments the gas turbine engine may have any other suitable configuration, such as any other suitable number or arrangement of shafts, compressors, turbines, fans, etc. Further, although the exemplary gas turbine engine depicted in FIG. 1 is shown schematically as a direct drive, fixed-pitch turbofan engine 100, in other embodiments, a gas turbine engine of the present disclosure may be a geared gas turbine engine (i.e., including a gearbox between the fan 126 and shaft driving the fan, such as the LP shaft 124), may be a variable pitch gas turbine engine (i.e., including a fan 126 having a plurality of fan blades 128 rotatable about their respective pitch axes), etc. Further, although not depicted herein, in other embodiments the gas turbine engine may be any other suitable type of gas turbine engine, such as an industrial gas turbine engine incorporated into a power generation system, a nautical gas turbine engine, etc. Further, still, in alternative embodiments, aspects of the present disclosure may be incorporated into, or otherwise utilized with, any other type of engine, such as reciprocating engines.

Moreover, it will be appreciated that although for the embodiment depicted, the turbofan engine 100 includes the fuel oxygen reduction unit 144 positioned within the turbomachine 104, i.e., within the casing 106 of the turbomachine 104, in other embodiments, the fuel oxygen reduction unit 144 may be positioned at any other suitable location. For example, in other embodiments, the fuel oxygen reduction unit 144 may instead be positioned remote from the turbofan engine 100, such as proximate to, or within, the tank of the fuel delivery system 146. Additionally, in other embodiments, the fuel oxygen reduction unit 144 may additionally or alternatively be driven by other suitable power sources such as an electric motor, a hydraulic motor, or an independent mechanical coupling to the HP or LP shaft, etc.

Figure 2:
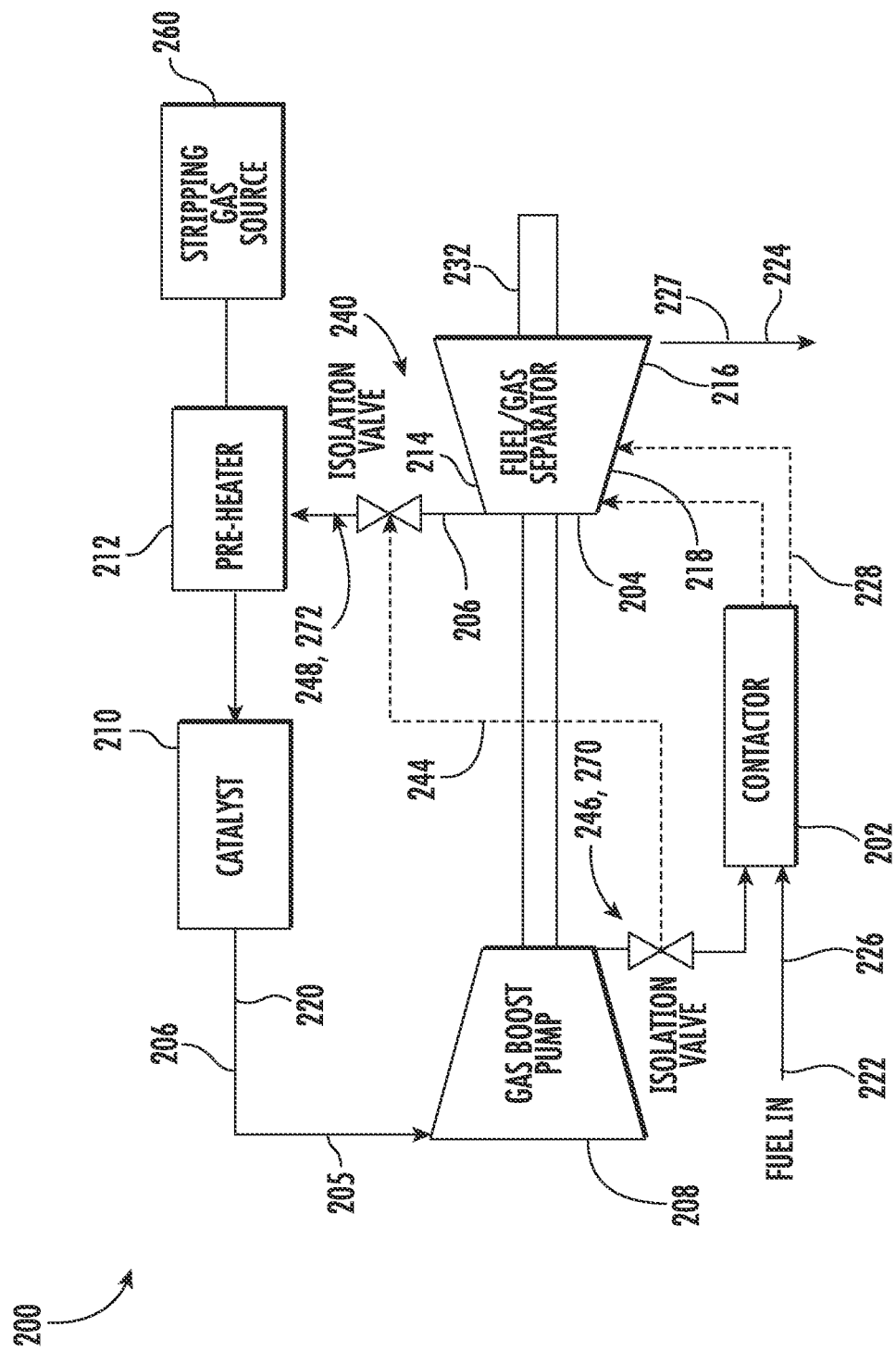
FIG. 2 is a schematic view of a fuel oxygen reduction unit in accordance with an exemplary embodiment of the present disclosure.

Referring now to FIG. 2, a schematic drawing of a fuel oxygen reduction unit 200 for a gas turbine engine in accordance with an exemplary embodiment of the present disclosure is provided. In at least certain exemplary embodiments, the exemplary fuel oxygen reduction unit 200 depicted may be incorporated into, e.g., the exemplary engine 100 described above with reference to FIG. 1 (e.g., may be the fuel oxygen reduction unit 144 depicted in FIG. 1 and described above).

As will be appreciated from the discussion herein, in an exemplary embodiment, the exemplary fuel oxygen reduction unit 200 of FIG. 2 generally includes a contactor 202, a separator 204, a pre-heater 212, a catalyst 210, a gas boost pump 208, and a stripping gas source 260. Moreover, the exemplary fuel oxygen reduction unit 200 generally defines a circulation gas flowpath 206 from the separator 204 to the contactor 202, with, for the embodiment depicted in FIG. 2, the pre-heater 212, the catalyst 210, and the gas boost pump 208 being positioned within or otherwise fluidly connected to the circulation gas flowpath 206.

In exemplary embodiments, the contactor 202 may be configured in any suitable manner to substantially mix a received gas and liquid flow. For example, the contactor 202 may, in certain embodiments, be a mechanically driven contactor (e.g., having paddles for mixing the received flows), or alternatively may be a passive contactor for mixing the received flows using, at least in part, a pressure and/or flowrate of the received flows. For example, a passive contactor may include one or more turbulators, a venturi mixer, etc.

Moreover, the exemplary fuel oxygen reduction unit 200 includes a stripping gas line 205, and more particularly, includes a plurality of stripping gas lines 205, which together at least in part define a circulation gas flowpath 206 extending from the separator 204 to the contactor 202. In certain exemplary embodiments, the circulation gas flowpath 206 may be formed of any combination of one or more conduits, tubes, pipes, etc. in addition to the plurality stripping gas lines 205 and structures or components within the circulation gas flowpath 206.

It will be appreciated that the fuel oxygen reduction unit 200 generally provides for a flow of stripping gas 220 through the plurality of stripping gas lines 205 and the stripping gas flowpath 206 during operation. It will be appreciated that the term "stripping gas" is used herein as a term of convenience to refer to a gas generally capable of performing the functions described herein. The stripping gas 220 flowing through the stripping gas flowpath/circulation gas flowpath 206 may be an actual stripping gas functioning to strip oxygen from the fuel within the contactor, or alternatively may be a sparging gas bubbled through a liquid fuel to reduce an oxygen content of such fuel. For example, as will be discussed in greater detail below, the stripping gas 220 may be an inert gas, such as Nitrogen or Carbon Dioxide ($CO_2$), a gas mixture made up of at least 50% by mass inert gas, or some other gas or gas mixture having a relatively low oxygen content.

Further, for the exemplary oxygen reduction unit depicted in FIG. 2, the fuel oxygen reduction unit 200 further includes a gas boost pump 208, a catalyst 210, and a pre-heater 212. For the embodiment shown, the gas boost pump 208, the catalyst 210, and the pre-heater 212 are each arranged within the circulation gas flowpath 206 in series flow. Additionally, the gas boost pump 208 is configured as a rotary gas pump mechanically coupled to, and driven by the fuel gas separator 204. In such a manner, the gas boost pump 208 is rotatable with fuel gas separator 204. However, in other embodiments, the gas boost pump 208 may be configured in any other suitable manner. For example, in other embodiments, the gas boost pump 208 may be mechanically disconnected from, and independently rotatable relative to, the fuel gas separator 204. For example, in certain embodiments, the gas boost pump 208 and/or separator 204 may be independently coupled to an accessory gearbox, or may be an electric pump electrically coupled to a suitable electrical power source, such as a permanent magnet alternator (PMA) that may also serve to provide power to a full authority digital control engine controller (FADEC). In an embodiment where the gas boost pump 208 is coupled to a power source independent of the separator 204, the gas boost pump 208 may rotate at a different rotational speed than the fuel gas separator 204.

In an exemplary embodiment using a permanent magnet alternator (PMA) as a power source for a gas boost pump 208 and/or separator 204, a full authority digital control engine controller (FADEC) is powered by a dedicated PMA, which is in turn rotated by/driven by an accessory gearbox of a gas turbine engine. The PMA is therefore sized to be capable of providing a sufficient amount of electrical power to the FADEC during substantially all operating conditions, including relatively low-speed operating conditions, such as start-up and idle. As the engine comes up to speed, however, the PMA may generate an increased amount electric power, while an amount of electric power required to operate the FADEC may remain relatively constant. Accordingly, as the engine comes up to speed the PMA may generate an amount of excess electric power that may need to be dissipated through an electrical sink.

The inventors of the present disclosure have found that a power consumption need for a fuel oxygen reduction unit may complement the power generation of the PMA. More specifically, the fuel oxygen reduction unit may need a relatively low amount of electric power during low rotational speeds of the gas turbine engine (when the PMA is not creating much excess electrical power), and a relatively high amount of electric power during high rotational speeds of the gas turbine engine (when the PMA is creating excess electrical power). Accordingly, by using the PMA to power the fuel oxygen reduction unit, the electrical power generated by the PMA may be more efficiently utilized.

It will be appreciated, however, that such a configuration is by way of example only, and in other embodiments the FADEC may be any other suitable engine controller, the PMA may be any other suitable electric machine, etc. Accordingly, in certain embodiments, an engine system is provided for an aircraft having an engine and an engine controller. The engine system includes an electric machine configured to be in electrical communication with the engine controller for powering the engine controller; and a fuel oxygen reduction unit defining a liquid fuel flowpath and a stripping gas flowpath and configured to transfer an oxygen content of a fuel flow through the liquid fuel flowpath to a stripping gas flow through the stripping gas flowpath, the fuel oxygen reduction unit also in electrical communication with the electric machine such that the electric machine powers at least in part the fuel oxygen reduction unit.

Referring to FIG. 2, in an exemplary embodiment, the separator 204 generally includes a stripping gas outlet 214, a fuel outlet 216, and an inlet 218. It will also be appreciated that the exemplary fuel oxygen reduction unit 200 depicted is operable with a fuel delivery system 146, such as a fuel delivery system 146 of the gas turbine engine including the fuel oxygen reduction unit 200 (see, e.g., FIG. 1). The exemplary fuel delivery system 146 generally includes a plurality of fuel lines, and in particular, an inlet fuel line 222 and an outlet fuel line 224. The inlet fuel line 222 is fluidly connected to the contactor 202 for providing a flow of liquid fuel or inlet fuel flow 226 to the contactor 202 (e.g., from a fuel source, such as a fuel tank) and the outlet fuel line 224 is fluidly connected to the fuel outlet 216 of the separator 204 for receiving a flow of deoxygenated liquid fuel or outlet fuel flow 227.

Moreover, during typical operations, a flow of stripping gas 220 flows through the circulation gas flowpath 206 from the stripping gas outlet 214 of the separator 204 to the contactor 202. More specifically, during typical operations, stripping gas 220 flows from the stripping gas outlet 214 of the separator 204, through the pre-heater 212 (configured to add heat energy to the gas flowing therethrough), through the catalyst 210, and to/through the gas boost pump 208, wherein a pressure of the stripping gas 220 is increased to provide for the flow of the stripping gas 220 through the circulation gas flowpath 206. The relatively high pressure stripping gas 220 (i.e., relative to a pressure upstream of the boost pump 208 and the fuel entering the contactor 202) is then provided to the contactor 202, wherein the stripping gas 220 is mixed with the flow of inlet fuel 226 from the inlet fuel line 222 to generate a fuel gas mixture 228. The fuel gas mixture 228 generated within the contactor 202 is provided to the inlet 218 of the separator 204.

Generally, it will be appreciated that during operation of the fuel oxygen reduction unit 200, the inlet fuel 226 provided through the inlet fuel line 222 to the contactor 202 may have a relatively high oxygen content. The stripping gas 220 provided to the contactor 202 may have a relatively low oxygen content or other specific chemical structure. Within the contactor 202, the inlet fuel 226 is mixed with the stripping gas 220, resulting in the fuel gas mixture 228. As a result of such mixing a physical exchange may occur whereby at least a portion of the oxygen within the inlet fuel 226 is transferred to the stripping gas 220, such that the fuel component of the mixture 228 has a relatively low oxygen content (as compared to the inlet fuel 226 provided through inlet fuel line 222) and the stripping gas component of the mixture 228 has a relatively high oxygen content (as compared to the inlet stripping gas 220 provided through the circulation gas flowpath 206 to the contactor 202).

Within the separator 204 the relatively high oxygen content stripping gas 220 is then separated from the relatively low oxygen content fuel 226 back into respective flows of an outlet stripping gas 220 and outlet fuel 227.

In one exemplary embodiment, the separator 204 may be a dual separator pump. For example, the separator 204 defines a central axis, radial direction, and a circumferential direction extending about the central axis. Additionally, the separator 204 is configured as a mechanically-driven dual separator pump, or more specifically as a rotary/centrifugal dual separator pump. Accordingly, the separator 204 may include an input shaft 232 and a single-stage separator/pump assembly. The input shaft 232 may be mechanically coupled to the single-stage separator/pump assembly, and the two components are together rotatable about the central axis. Further, the input shaft 232 may be mechanically coupled to, and driven by, e.g., an accessory gearbox (such as the exemplary accessory gearbox 142 of FIG. 1). However, in other embodiments, the input shaft 232 may be mechanically coupled to any other suitable power source, such as an electric motor, PMA, or other electrical power source. As will be appreciated, the single-stage separator/pump assembly may simultaneously separate the mixture 228 into flows of an outlet stripping gas 220 and outlet fuel 227 from the mixture 228 and increase a pressure of the separated outlet fuel 227.

Additionally, an exemplary single-stage separator/pump assembly may include an inner gas filter arranged along the central axis and a plurality of paddles positioned outward of the inner gas filter along the radial direction. During operation, a rotation of the single-stage separator/pump assembly about the central axis, and more specifically, a rotation of the plurality of paddles about the central axis (i.e., in the circumferential direction), may generally force heavier liquid fuel 226 outward along the radial direction and lighter stripping gas 220 inward along the radial direction through the inner gas filter. In such a manner, the outlet fuel 227 may exit through the fuel outlet 216 of the separator 204 and the outlet stripping gas 220 may exit through the gas outlet 214 of the separator 204.

Further, it will be appreciated that with such a configuration, the outlet fuel 227 exiting the separator 204 through the fuel outlet 216 may be at a higher pressure than the inlet fuel 226 provided through inlet fuel line 222, and further higher than the fuel/gas mixture 228 provided through the inlet 218. Such may be due at least in part to the centrifugal force exerted on such liquid fuel 226 and the rotation of the plurality of paddles. Additionally, it will be appreciated that for some embodiments, the liquid fuel outlet 216 is positioned outward of the inlet 218 (i.e., the fuel gas mixture inlet) along the radial direction. Such may also assist with the increasing of the pressure of the outlet fuel 227 provided through the fuel outlet 216 of the separator 204.

For example, it will be appreciated that with such an exemplary embodiment, the separator 204 of the fuel oxygen reduction unit 200 may generate a pressure rise in the fuel flow during operation. As used herein, the term "pressure rise" refers to a net pressure differential between a pressure of the flow of outlet fuel 227 provided to the fuel outlet 216 of the separator 204 (i.e., a "liquid fuel outlet pressure") and a pressure of the inlet fuel 226 provided through the inlet fuel line 222 to the contactor 202. In at least certain exemplary embodiments, the pressure rise of the liquid fuel 226 may be at least about sixty (60) pounds per square inch ("psi"), such as at least about ninety (90) psi, such as at least about one hundred (100) psi, such as up to about seven hundred and fifty (750) psi. With such a configuration, it will be appreciated that in at least certain exemplary embodiments of the present disclosure, the liquid fuel outlet pressure may be at least about seventy (70) psi during operation. For example, in at least certain exemplary embodiments, the liquid fuel out of pressure may be at least about one hundred (100) psi during operation, such as at least about one hundred and twenty-five (125) psi during operation, such as up to about eight hundred (800) psi during operation.

Further, it will be appreciated that the outlet fuel 227 provided to the fuel outlet 216, having interacted with the stripping gas 220, may have a relatively low oxygen content, such that a relatively high amount of heat may be added thereto with a reduced risk of the fuel coking (i.e., chemically reacting to form solid particles which may clog up or otherwise damage components within the fuel flow path). For example, in at least certain exemplary aspects, the outlet fuel 227 provided to the fuel outlet 216 may have an oxygen content of less than about five (5) parts per million ("ppm"), such as less than about three (3) ppm, such as less than about two (2) ppm, such as less than about one (1) ppm, such as less than about 0.5 ppm.

Moreover, as will be appreciated, the exemplary fuel oxygen reduction unit 200 depicted recirculates and reuses at least some of, or all of the stripping gas 220 (i.e., the stripping gas 220 operates in a substantially closed loop). However, the stripping gas 220 exiting the separator 204, having interacted with the liquid fuel 226, has a relatively high oxygen content. Accordingly, in order to reuse the stripping gas 220, an oxygen content of the stripping gas 220 from the outlet 214 of the separator 204 needs to be reduced. For the embodiment depicted, and as noted above, the stripping gas 220 flows through the pre-heater 212 and through the catalyst 210 where the oxygen content of the stripping gas 220 is reduced. More specifically, within the catalyst 210 the relatively oxygen-rich stripping gas 220 is reacted to reduce the oxygen content thereof. It will be appreciated that catalyst 210 may be configured in any suitable manner to perform such functions. For example, in certain embodiments, the catalyst 210 may be configured to combust the relatively oxygen-rich stripping gas 220 to reduce an oxygen content thereof. However, in other embodiments, the catalyst 210 may additionally, or alternatively, include geometries of catalytic components through which the relatively oxygen-rich stripping gas 220 flows to reduce an oxygen content thereof. In one or more of these configurations, a byproduct may be produced, such as water. The water, if produced, may be in vapor form and continue as part of the stripping gas 220. Alternatively, the water or other byproduct, if produced, may be ducted away from the catalyst 210 (duct not depicted in the embodiment of FIG. 2). In one or more of these embodiments, the catalyst 210 may be configured to reduce an oxygen content of the stripping gas 220 to less than about five percent (5%) oxygen ($O_2$) by mass, such less than about two (2) percent (3%) oxygen ($O_2$) by mass, such less than about one percent (1%) oxygen ($O_2$) by mass.

The resulting relatively low oxygen content gas is then provided through the remainder of the circulation gas flowpath 206 and back to the contactor 202, such that the cycle may be repeated. In such a manner, it will be appreciated that the stripping gas 220 may be any suitable gas capable of undergoing the chemical transitions described above.

As described above, the exemplary fuel oxygen reduction unit 200 defines a circulation gas flowpath 206 extending from the separator 204 to the contactor 202. In one exemplary embodiment, an isolation valve or valve system 240 is in airflow communication with the circulation gas flowpath 206 for modulating a gas flow through the circulation gas flowpath 206 to the contactor 202, or rather a flow of stripping gas 220. In certain exemplary embodiments, the circulation gas flowpath 206 may be formed of any combination of one or more conduits, tubes, pipes, etc., as well as structures of components within the circulation gas flowpath 206. In exemplary embodiments, the isolation value may be configured as a shutoff valve or a diverter valve.

For example, referring to FIG. 2, in an exemplary embodiment, the isolation valve is configured as a diverter valve. More specifically, the fuel oxygen reduction unit 200 further defines a bypass gas flowpath 244 in fluid communication with the circulation gas flowpath 206 for bypassing the contactor 202 and the fuel gas separator 204 during certain operations. More specifically, the exemplary bypass gas flowpath 244 is in fluid communication with the circulation gas flowpath 206 at a first location 246 positioned upstream of the contactor 202 and a second location 248 positioned downstream of the fuel gas separator 204. More specifically, for the embodiment depicted, the first location 246 is further positioned downstream of the gas boost pump 208 (i.e., between the gas boost pump 208 and the contactor 202) and the second location 248 is positioned upstream of the catalyst 210 and pre-heater 212 (i.e., between the catalyst 210 and the fuel gas separator 204).

Referring to FIG. 2, in an exemplary embodiment, the isolation valve system 240 includes a first diverter valve 270 positioned at the first location 246, and the fuel oxygen reduction unit 200 further includes a second diverter valve 272 positioned at the second location 248. Notably, however, in other embodiments, the fuel oxygen reduction unit 200 may only include one diverter valve, with such diverter valve being positioned at the first location 246, or alternatively, the second location 248. It should also be appreciated that the term "diverter valve" simply refers to a valve, or plurality of valves capable of redirecting at least a portion of a fluid flow from a first fluid path to a second fluid path. Accordingly, in certain exemplary embodiments, one or both of the diverter valves 270, 272 may be configured as a variable, three-way fluid valve, as a two-way shut off valve (located downstream of a junction, as a pair of shut off valves, etc.

The exemplary diverter valves 270, 272 depicted are further in fluid communication with the bypass gas flowpath 244 and are configured for selectively diverting the flow of stripping gas 220 through the circulation gas flowpath 206 to the bypass gas flowpath 244, and around the contactor 202 and separator 204. For example, the diverter valves 270, 272 may be configured to divert one hundred percent (100%) of the flow of stripping gas 220 through the circulation gas flowpath 206 to the bypass gas flowpath 244 to substantially completely bypass the contactor 202 and separator 204 during certain operations. However, in other exemplary embodiments, the diverter valves 270, 272 may be configured to divert less than one hundred percent (100%) of the flow of stripping gas 220 through the circulation gas flowpath 206 to the bypass gas flowpath 244 (such as at least ten percent (10%), such as at least twenty percent (20%), such as at least fifty percent (50%), such as up to fifty percent (50%), such as up to seventy-five percent (75%), such as up to ninety percent (90%)).

Figure 3:
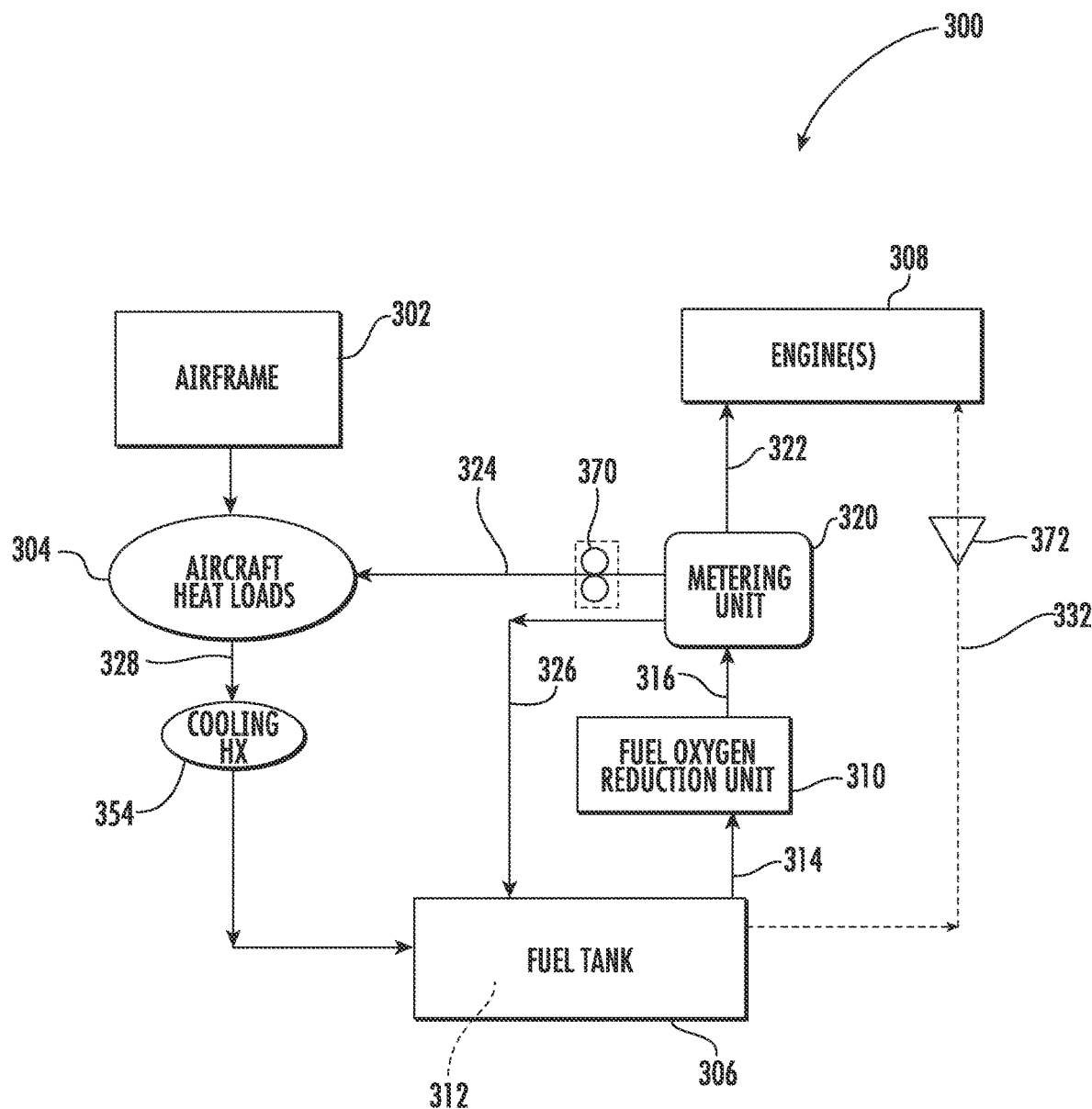
FIG. 3 is a schematic view of an aircraft thermal transport system in accordance with an exemplary embodiment of the present disclosure.
Figure 4:
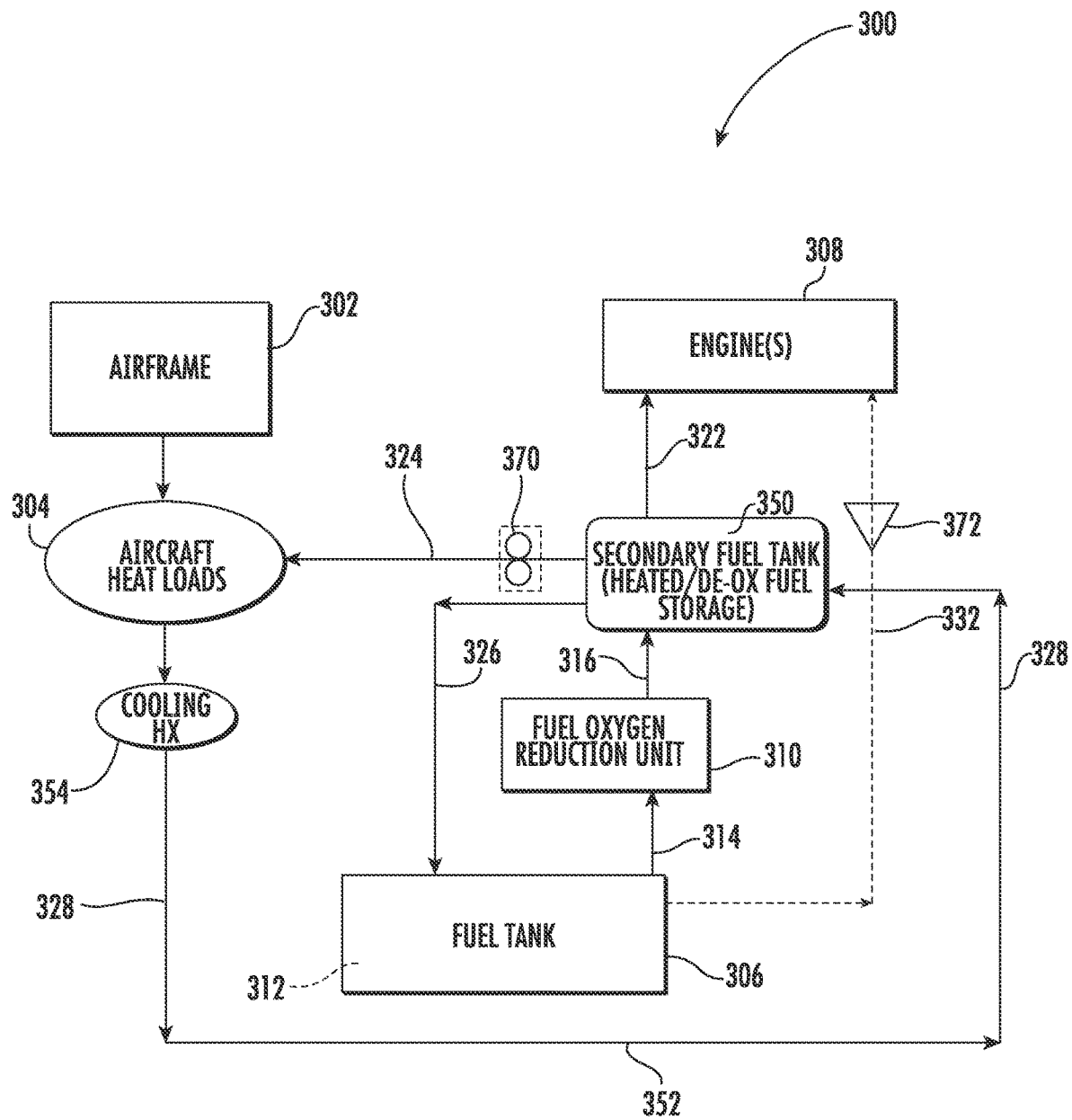
FIG. 4 is a schematic view of an aircraft thermal transport system in accordance with another exemplary embodiment of the present disclosure.
Figure 5:
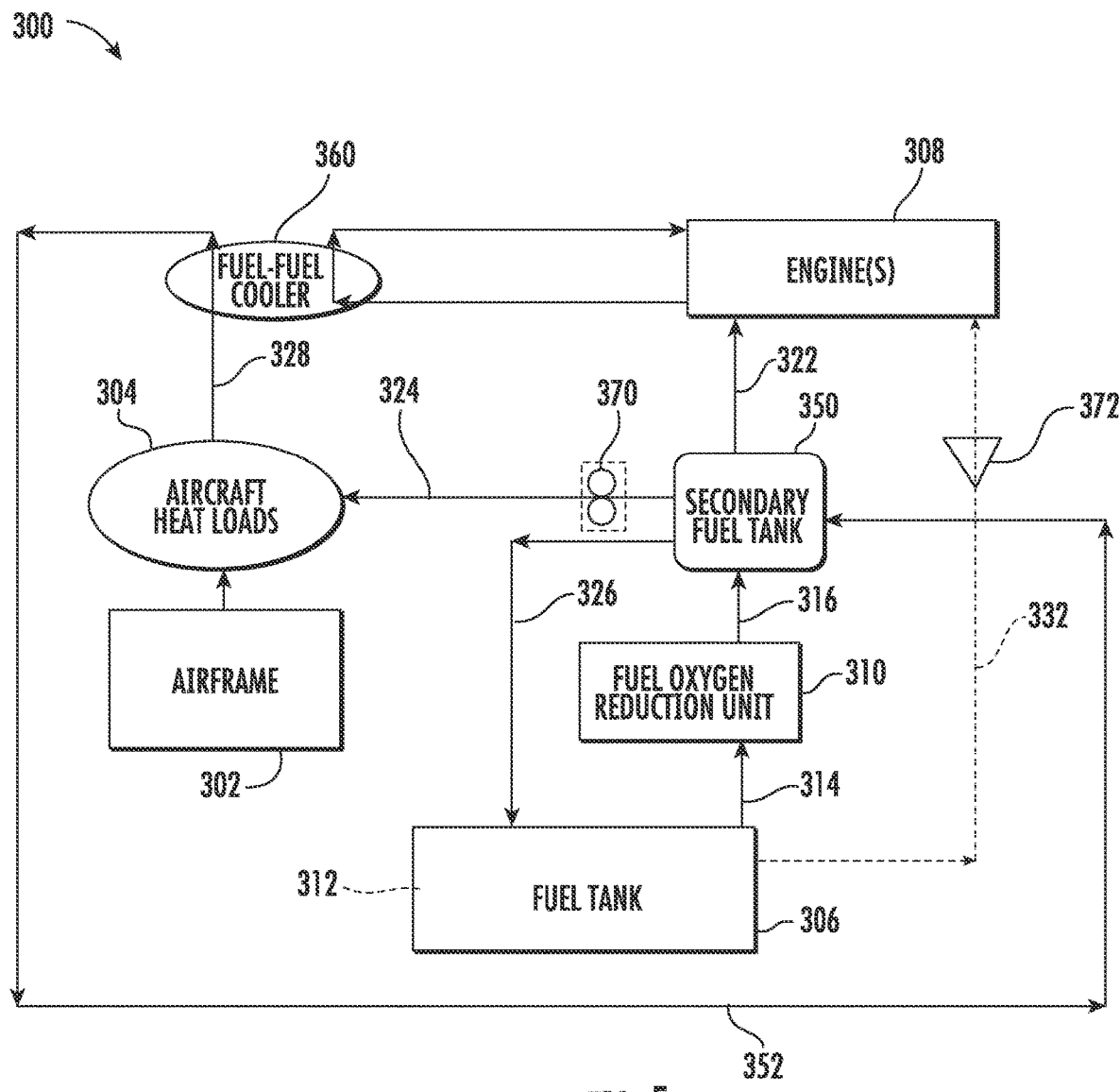
FIG. 5 is a schematic view of an aircraft thermal transport system in accordance with another exemplary embodiment of the present disclosure.

FIGS. 3-5 illustrate schematic drawings of an aircraft thermal transport system 300 for an aeronautical engine, e.g., a gas turbine engine, in accordance with exemplary aspects of the present disclosure.

Referring now to FIG. 3, a schematic drawing of an aircraft thermal transport system 300 for an aeronautical engine, e.g., a gas turbine engine, in accordance with an exemplary aspect of the present disclosure is provided. In at least certain exemplary embodiments, the exemplary aircraft thermal transport system 300 depicted in FIG. 3 may be incorporated into, e.g., the exemplary engine 100 described above with reference to FIG. 1.

In an aircraft thermal transport system of the present disclosure, the aircraft thermal transport system utilizes a fuel oxygen reduction unit to remove or reduce the oxygen content of an inlet fuel flow and to provide an outlet fuel flow that exits the fuel oxygen reduction unit having a relatively low oxygen content, e.g., the outlet fuel flow is deoxygenated fuel. Accordingly, this enables the system of the present disclosure to use the fuel between an engine and an airframe to transport and reject heat. In the system of the present disclosure the fuel is now able to operate at the higher temperature requirements required of such a system without the risk of the fuel "coking". In other words, by utilizing the outlet fuel flow being a deoxygenated fuel, the system of the present disclosure enables using the fuel directly to cool the avionics/aircraft heat load demands and thereby eliminates the need for an additional fluid PAO system and all of the complexity, weight, and cost associated with it. The system of the present disclosure enables the use of the deoxygenated fuel as a coolant for components of the airframe.

This has been impossible in conventional systems due to the temperature limitations of fuel. For example, in conventional systems, due to the oxygen in the fuel, heating the fuel up in this manner may cause the fuel to "coke" as described above. As such, in conventional systems, a dedicated intermediate fluid system, e.g., a PAO system, is used to move heat from aircraft avionics and other loads to be rejected by engine air and fuel. The use of a PAO system in conventional systems introduces the need for an additional fluid PAO system and all of the complexity, weight, and cost associated with it.

Referring to FIG. 3, in an exemplary embodiment of the present disclosure, an aircraft thermal transport system 300 includes an airframe 302 having an aircraft heat load 304, a fuel tank 306 containing a fuel 312, engine 308, and a fuel oxygen reduction unit 310. The fuel oxygen reduction unit 310 may comprise the fuel oxygen reduction unit 200 depicted in FIG. 2 and described in detail above. The engine 308 may comprise the engine 100 depicted in FIG. 1 and described in detail above. Furthermore, as previously discussed, it is contemplated that the engine and the system of the present disclosure are part of a military aircraft capable of supersonic speeds.

Referring still to FIG. 3, the fuel oxygen reduction unit 310 is in communication with an inlet fuel flow 314 from the fuel tank 306. The fuel oxygen reduction unit 310 is configured, as described above with reference to fuel oxygen reduction unit 200 (FIG. 2), to reduce an amount of oxygen in the inlet fuel flow 314. In this manner, an outlet fuel flow 316 that exits the fuel oxygen reduction unit 310 has a relatively low oxygen content, such that a relatively high amount of heat may be added thereto with a reduced risk of the fuel coking (i.e., chemically reacting to form solid particles which may clog up or otherwise damage components within the fuel flow path). For example, in at least certain exemplary aspects, the outlet fuel 316 that exits the fuel oxygen reduction unit 310 may have an oxygen content of less than about five (5) parts per million ("ppm"), such as less than about three (3) ppm, such as less than about two (2) ppm, such as less than about one (1) ppm, such as less than about 0.5 ppm.

Referring to FIG. 3, in an exemplary embodiment of the present disclosure, an aircraft thermal transport system 300 also includes a metering unit or control unit 320 that is in communication with the outlet fuel flow 316 from the fuel oxygen reduction unit 310. A control unit 320 of the aircraft thermal transport system 300 is configured to direct a first portion of the outlet fuel flow 322 to the engine 308 and the control unit 320 is configured to direct a second portion of the outlet fuel flow 324 to the airframe 302 to transfer heat between the second portion of the outlet fuel flow 324 and the aircraft heat load 304. In some exemplary embodiments, the control unit 320 is also configured to direct a bypass portion of the outlet fuel flow 326 back to the fuel tank 306.

Referring to FIG. 3, in an exemplary embodiment, the second portion of the outlet fuel flow 324 that travels to the airframe 302 to transfer heat between the second portion of the outlet fuel flow 324 and the aircraft heat load 304 may then travel back to fuel tank 306 as heated fuel flow 328. In the exemplary embodiment shown in FIG. 3, the heated fuel flow 328 may flow through a cooling heat exchanger 354 and then travel back to the fuel tank 306.

In the system 300 of the present disclosure, the second portion of the outlet fuel flow 324 cools the aircraft heat load 304. In other words, the system 300 of the present disclosure utilizes the fuel shared between the engine 308 and the airframe 302 to transport and reject heat. This has been impossible in conventional systems due to the temperature limitations of fuel. For example, in conventional systems, due to the oxygen in the fuel, heating the fuel up in this manner may cause the fuel to "coke" as described above. As such, in conventional systems, a dedicated intermediate fluid system, e.g., a PAO system, is used to move heat from aircraft avionics and other loads to be rejected by engine air and fuel. The use of a PAO system in conventional systems introduces the need for an additional fluid PAO system and all of the complexity, weight, and cost associated with it.

Importantly, the aircraft thermal transport system 300 utilizes the fuel oxygen reduction unit 310 to remove or reduce the oxygen content of the inlet fuel flow 314 and to provide an outlet fuel flow 316 that exits the fuel oxygen reduction unit 310 that has a relatively low oxygen content, e.g., the outlet fuel flow 316 is deoxygenated fuel. Accordingly, this enables the system 300 of the present disclosure to use the fuel 316 between the engine 308 and the airframe 302 to transport and reject heat. In the system 300 of the present disclosure the fuel 316 is now able to operate at the higher temperature requirements required of such a system without the risk of the fuel 316 "coking". In other words, by utilizing the outlet fuel flow 316 being a deoxygenated fuel, the system 300 of the present disclosure enables using the fuel 316 directly to cool the avionics/aircraft heat load demands and thereby eliminates the need for an additional fluid PAO system and all of the complexity, weight, and cost associated with it. The system 300 of the present disclosure enables the use of the deoxygenated fuel 316 as a coolant for components of the airframe 302.

As such, it is contemplated that the second portion of the outlet fuel flow 324, e.g., the deoxygenated fuel, is able to operate at a temperature greater than 250 degrees Fahrenheit without the risk or reducing the risk of the fuel 324 "coking". Furthermore, in other exemplary embodiments, the second portion of the outlet fuel flow 324, e.g., the deoxygenated fuel, is able to operate at a temperature greater than 300 degrees Fahrenheit without the risk or reducing the risk of the fuel 324 "coking". In other exemplary embodiments, the second portion of the outlet fuel flow 324, e.g., the deoxygenated fuel, is able to operate at a temperature greater than 400 degrees Fahrenheit without the risk or reducing the risk of the fuel 324 "coking". In other exemplary embodiments, the second portion of the outlet fuel flow 324, e.g., the deoxygenated fuel, is able to operate at a temperature greater than 500 degrees Fahrenheit without the risk or reducing the risk of the fuel 324 "coking". In other exemplary embodiments, the second portion of the outlet fuel flow 324, e.g., the deoxygenated fuel, is able to operate at a temperature greater than 600 degrees Fahrenheit without the risk or reducing the risk of the fuel 324 "coking". In other exemplary embodiments, the second portion of the outlet fuel flow 324, e.g., the deoxygenated fuel, is able to operate at a temperature greater than 700 degrees Fahrenheit without the risk or reducing the risk of the fuel 324 "coking".

Referring to FIGS. 4 and 5, in other exemplary embodiments, the aircraft thermal transport system 300 also includes a secondary fuel tank 350 that is in communication with a portion of the outlet fuel flow 316 that exits the fuel oxygen reduction unit 310. It is contemplated that the secondary fuel tank 350 could be used to store the thermal energy picked up in the heated fuel flow. For example, as shown in FIGS. 4 and 5, the system 300 may include a supply line 352 that travels from the aircraft heat load 304 to the secondary fuel tank 350. In this manner, the second portion of the outlet fuel flow 324 that travels to the airframe 302 to transfer heat between the second portion of the outlet fuel flow 324 and the aircraft heat load 304 may then travel through supply line 352, e.g., as heated fuel flow 328, directly to secondary fuel tank 350. In the exemplary embodiment shown in FIG. 3, the heated fuel flow 328 may flow through a cooling heat exchanger 354 and then flow back to the fuel tank 306.

Referring to FIG. 5, in another exemplary embodiment, the aircraft thermal transport system 300 also includes a fuel-fuel heat exchanger 360 that is in communication with the second portion of the outlet fuel flow 324 downstream of the airframe 302. In such an embodiment, the second portion of the outlet fuel flow 324 that travels to the airframe 302 to transfer heat between the second portion of the outlet fuel flow 324 and the aircraft heat load 304 may then travel through the fuel-fuel heat exchanger 360 and then travel through supply line 352 directly to secondary fuel tank 350.

Furthermore, referring to FIGS. 3-5, in other exemplary embodiments, the aircraft thermal transport system 300 may include a pump 370 for increasing the pressure and flow of a second portion of the outlet fuel flow 324 to the airframe 302 to transfer heat between the second portion of the outlet fuel flow 324 and the aircraft heat load 304.

As described above, it is contemplated that the engine and the system of the present disclosure are part of a military aircraft capable of supersonic speeds. As such, referring to FIGS. 3-5, a military supersonic engine or aircraft may include an afterburn flow 332 that travels directly from the fuel tank 306 to the engine 308. Such afterburn flow 332 does not need to travel through fuel oxygen reduction unit 310. Accordingly, the size and demand of the fuel oxygen reduction unit 310 can be minimized and kept down in size. It is contemplated that an optional valve 372 may be disposed along the afterburn flow 332 between the fuel tank 306 and engine 308.

In an exemplary aspect of the present disclosure, a method is provided for using a fuel with an engine, an airframe having an aircraft heat load, a fuel tank, and a fuel oxygen reduction unit. The method includes receiving an inlet fuel flow in the fuel oxygen reduction unit for reducing an amount of oxygen in the inlet fuel flow; separating a fuel/gas mixture within the fuel oxygen reduction unit into an outlet gas flow and an outlet fuel flow exiting the fuel oxygen reduction unit; controlling a first portion of the outlet fuel flow to the engine; and controlling a second portion of the outlet fuel flow to the airframe to transfer heat between the second portion of the outlet fuel flow and the aircraft heat load.

Further aspects of the invention are provided by the subject matter of the following clauses:

1. A method for using a fuel with an engine, an airframe having an aircraft heat load, a fuel tank, and a fuel oxygen reduction unit, the method comprising: receiving an inlet fuel flow in the fuel oxygen reduction unit for reducing an amount of oxygen in the inlet fuel flow; separating a fuel/gas mixture within the fuel oxygen reduction unit into an outlet gas flow and an outlet fuel flow exiting the fuel oxygen reduction unit; controlling a first portion of the outlet fuel flow to the engine; and controlling a second portion of the outlet fuel flow to the airframe to transfer heat between the second portion of the outlet fuel flow and the aircraft heat load.

2. The method of any preceding clause, further comprising sending the outlet fuel flow exiting the fuel oxygen reduction unit to a metering unit that splits and controls the first portion of the outlet fuel flow and the second portion of the outlet fuel flow.

3. The method of any preceding clause, further comprising directing a bypass flow of a third portion of the outlet fuel flow from the metering unit to the fuel tank.

4. The method of any preceding clause, wherein the outlet fuel flow is deoxygenated fuel.

5. The method of any preceding clause, wherein the second portion of the outlet fuel flow cools the aircraft heat load.

6. The method of any preceding clause, wherein the second portion of the outlet fuel flow is at a temperature greater than 250 degrees Fahrenheit.

7. The method of any preceding clause, wherein the second portion of the outlet fuel flow is at a temperature greater than 300 degrees Fahrenheit.

8. The method of any preceding clause, wherein the second portion of the outlet fuel flow is at a temperature greater than 400 degrees Fahrenheit.

9. The method of any preceding clause, further comprising directing the second portion of the outlet fuel flow that cools the aircraft heat load to a fuel-fuel heat exchanger.

10. The method of any preceding clause, wherein the separating step comprises reducing an amount of oxygen in the inlet fuel flow using a stripping gas flow through a stripping gas flowpath and separating the fuel/gas mixture within the fuel oxygen reduction unit into an outlet stripping gas flow and the outlet fuel flow exiting the fuel oxygen reduction unit.

11. The method of any preceding clause, further comprising storing a portion of the outlet fuel flow exiting the fuel oxygen reduction unit in a secondary fuel tank.

12. An aircraft thermal transport system, comprising: an engine; an airframe having an aircraft heat load; a fuel tank having a fuel; a fuel oxygen reduction unit in communication with an inlet fuel flow from the fuel tank, the fuel oxygen reduction unit configured to reduce an amount of oxygen in the inlet fuel flow, wherein an outlet fuel flow exits the fuel oxygen reduction unit; and a control unit in communication with the outlet fuel flow from the fuel oxygen reduction unit, wherein the control unit is configured to direct a first portion of the outlet fuel flow to the engine, and wherein the control unit is configured to direct a second portion of the outlet fuel flow to the airframe to transfer heat between the second portion of the outlet fuel flow and the aircraft heat load.

13. The aircraft thermal transport system of any preceding clause, wherein the control unit is configured to direct a bypass portion of the outlet fuel flow back to the fuel tank.

14. The aircraft thermal transport system of any preceding clause, wherein the outlet fuel flow is deoxygenated fuel.

15. The aircraft thermal transport system of any preceding clause, wherein the second portion of the outlet fuel flow cools the aircraft heat load.

16. The aircraft thermal transport system of any preceding clause, wherein the second portion of the outlet fuel flow is at a temperature greater than 300 degrees Fahrenheit.

17. The aircraft thermal transport system of any preceding clause, wherein the second portion of the outlet fuel flow is at a temperature greater than 400 degrees Fahrenheit.

18. The aircraft thermal transport system of any preceding clause, further comprising a fuel-fuel heat exchanger in communication with the second portion of the outlet fuel flow downstream of the airframe.

19. The aircraft thermal transport system of any preceding clause, further comprising a secondary fuel tank in communication with a portion of the outlet fuel flow that exits the fuel oxygen reduction unit.

20. The aircraft thermal transport system of any preceding clause, wherein the fuel oxygen reduction unit further comprises: a stripping gas line; a contactor in fluid communication with the stripping gas line and the inlet fuel flow for forming a fuel/gas mixture; and a separator in fluid communication with the contactor, the separator receives the fuel/gas mixture and separates the fuel/gas mixture into an outlet stripping gas flow and the outlet fuel flow.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

While this disclosure has been described as having exemplary designs, the present disclosure can be further modified within the spirit and scope of this disclosure. This application is therefore intended to cover any variations, uses, or adaptations of the disclosure using its general principles. Further, this application is intended to cover such departures from the present disclosure as come within known or customary practice in the art to which this disclosure pertains and which fall within the limits of the appended claims.

What is claimed is:

1. A method for using a fuel with an engine, an airframe having an aircraft heat load, a fuel tank, and a fuel oxygen reduction unit, the method comprising:

receiving an inlet fuel flow in the fuel oxygen reduction unit for reducing an amount of oxygen in the inlet fuel flow;

separating a fuel/gas mixture within the fuel oxygen reduction unit into an outlet gas flow and an outlet fuel flow exiting the fuel oxygen reduction unit;

directing a first portion of the outlet fuel flow to the engine;

directing a second portion of the outlet fuel flow to the airframe to transfer heat between the second portion of the outlet fuel flow and the aircraft heat load;

sending the outlet fuel flow exiting the fuel oxygen reduction unit to a metering unit that splits and controls the first portion of the outlet fuel flow and the second portion of the outlet fuel flow; and directing a bypass flow of a third portion of the outlet fuel flow from the metering unit to the fuel tank.

2. The method of claim 1, wherein the outlet fuel flow is deoxygenated fuel.

3. The method of claim 1, wherein the second portion of the outlet fuel flow cools the aircraft heat load.

4. The method of claim 3, wherein the second portion of the outlet fuel flow is at a temperature greater than 250 degrees Fahrenheit.

5. The method of claim 3, wherein the second portion of the outlet fuel flow is at a temperature greater than 300 degrees Fahrenheit.

6. The method of claim 3, wherein the second portion of the outlet fuel flow is at a temperature greater than 400 degrees Fahrenheit.

7. The method of claim 3, further comprising directing the second portion of the outlet fuel flow that cools the aircraft heat load to a fuel-fuel heat exchanger.

8. The method of claim 1, wherein the separating step comprises reducing an amount of oxygen in the inlet fuel flow using a stripping gas flow through a stripping gas flowpath and separating the fuel/gas mixture within the fuel oxygen reduction unit into an outlet stripping gas flow and the outlet fuel flow exiting the fuel oxygen reduction unit.

9. The method of claim 1, further comprising storing a portion of the outlet fuel flow exiting the fuel oxygen reduction unit in a secondary fuel tank.

* * * * *